Patented May 19, 1942

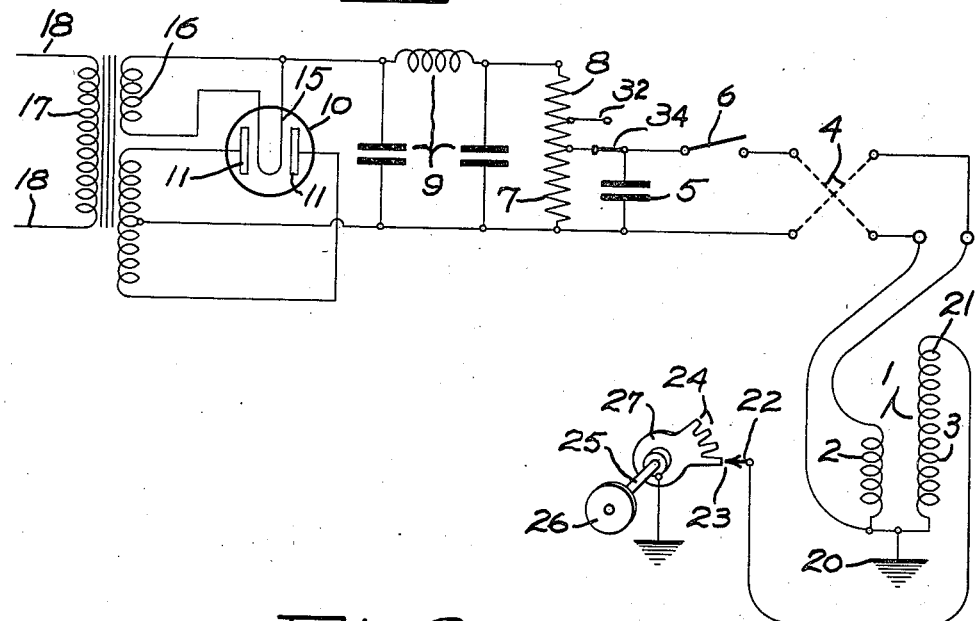
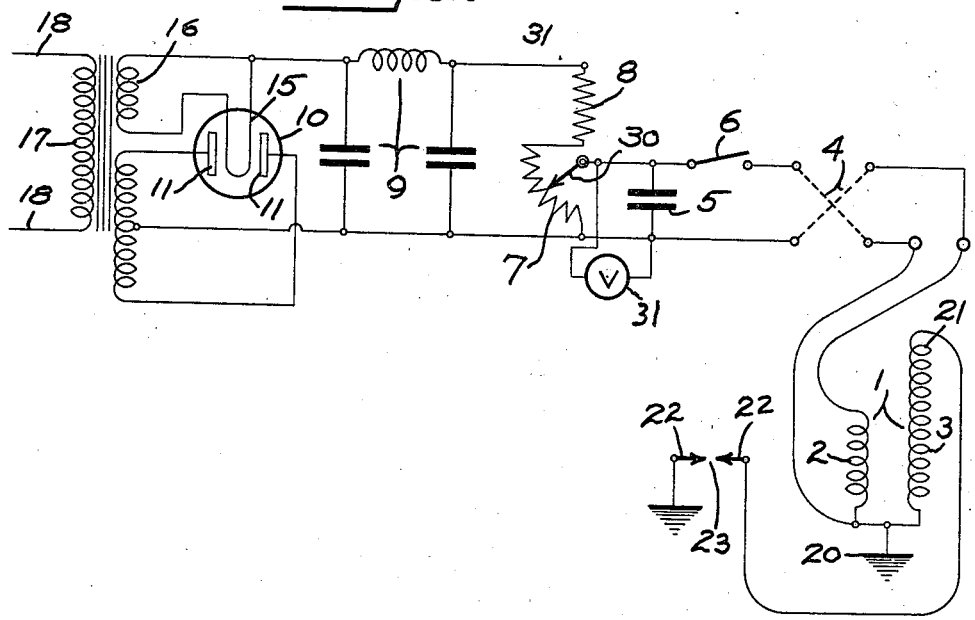

2,283,399

UNITED STATES PATENT OFFICE 2,283,399

MEANS AND METHOD OF TESTING SPARK COILS

Stanley S. Verney, San Francisco, Calif., assignor to Auto Electric Supply Co., San Francisco, Calif., a partnership composed of said Verney and Samuel Casper Application October 19, 1940, Serial No. 361,887

8 Claims. (Cl. 175—183)

My invention relates to a means and method of testing spark coils, and more particularly for testing high tension coils used for ignition purposes in conjunction with internal combustion engines. My invention is applicable to both battery energized coils and magneto coils.

Among the objects of my invention are: To provide a means and method of testing spark coil potentials; to provide a uniform means and method of testing spark coils, with or without cores therein; to provide a means and method of testing spark coils on a potential basis; to provide a means and method of uniformly testing spark coils substantially independent of the make of coil; to provide means and method of coil testing which gives uniform results, free from anomalies caused by thermionic ionization of a test-gap; and to provide a simple and fast means and method of testing spark coils.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In the drawing:

Fig. 1 is a circuit diagram of one form of my invention.

Fig. 2 is a circuit diagram of an alternate form of my invention.

My invention may be more fully understood by direct reference to the drawing:

In Fig. 1 the spark coil 1 to be tested has a primary 2 and a secondary 3, and leads from the primary 2 are connected to a reversing switch 4. The reversing switch is utilized because some coils may give a slightly better spark with one connection than the other. The primary 2 is connected across a storage condenser 5, preferably of the order of 1 mf. capacity, through a control switch 6 preferably of the "quick-make" type. The storage condenser 4 is charged through a portion 7 of a voltage dividing resistor 8, the latter being supplied with D. C. through filter 9 from a rectifier tube 10. The anodes 11 of this tube are supplied by anode winding 12 on power transformer 14. The filament 15 of the tube 10 is supplied from filament secondary 16 on transformer 14, this transformer being energized by primary winding 17 through power leads 18.

Practically all spark coils have one end of the primary and secondary connected together, and this wire is connected to a ground 20. The high potential end of the secondary 21 is connected to a stationary electrode 22 forming a part of a spark gap 23. Opposed to the fixed electrode 22 is one of a plurality of movable electrodes 24 of different length, mounted on a shaft 25 rotatable by means of hand wheel 26. Electrode carrying member 27 is grounded to complete the secondary circuit. Thus the spark gap can be varied in length by turning hand wheel 26.

In operation the coil 1 is connected in the circuit and the shortest gap is preferably set up between one of the electrodes 24 and fixed electrode 22. The rectifier tube is energized, and storage condenser 5 charges to a potential predetermined by the amount of voltage divider resistor 7 in parallel with the condenser 5 and the potential delivered by the rectifier circuit. When the storage condenser 5 has reached its final potential, switch 6 is closed to discharge the condenser through primary 2 of coil 1, and to produce, if the coil is operative, a spark in gap 23. Switch 6 may then be opened and condenser 5 will charge to its original potential. If a proper spark has been produced across the shortest gap, member 27 may be rotated to bring shorter electrodes 24 in opposition to fixed electrode 22, thereby lengthening the gap so that the longest spark that can be obtained from secondary 3 of the coil, may be determined by successive condenser discharges.

By comparison with a coil that is known to be good, the adjustable gap may be calibrated to indicate good or bad condition of the coil being tested. Due to the fact that the same small predetermined quantity of electricity is passed through the primary 2 each time the switch 6 is closed, any defect in the coils under test, such as shorted turns, leaks or opens, etc., are immediately noticeable in the air gap.

I prefer to refer to the discharging action of the condenser, as the release of a single energy surge through the primary 2 as the field thereof will be built up and collapsed substantially instantaneously, even though this surge may be somewhat oscillatory in character. Each time the condenser is discharged this surge will be identical in quantity, and will be substantially independent of coil constants.

The time of discharge is substantially constant for any particular coil, as the operation of the system is independent of the length of time switch 6 is closed, inasmuch as primary 2 is substantially a short across condenser 5 and charging resistor section 7, and only a small D. C. charging current passes through the primary when the switch is closed, and none of course, when the switch is open.

It is not necessary to have a core in the coil under test, as the system just above described does not in any manner measure the quality of spark produced, i. e., whether the spark is fat or thin, but merely indicates the secondary potential produced by a small predetermined primary input. Furthermore, the test is substantially independent of primary wire size, due to the fact that a small fixed quantity of electricity is used to test the coils. Furthermore, because only one spark discharge group is produced each time the switch 5 is closed, there is no tendency for the spark gap to heat, thereby eliminating false readings which may often occur when a continuous secondary discharge is measured, owing to thermal ionization in the gap.

In Fig. 2 I have shown a slightly modified system, operating however, in exactly the same fundamental manner. In this case two fixed electrodes 22 are utilized, thus providing a spark gap 23 of fixed length. The connections are otherwise the same, with the exception that the charging portion 7 of the voltage dividing resistor 8 is made variable by means of a contact arm 30, so that the charge stored in capacity 5 may be varied. The position of the contact arm 30 may be calibrated with reference to voltmeter 31, and the minimum setting necessary to produce a spark across the gap between electrodes 22 may then be determined. This calibration of the charging resistor may be referred to coils known to be good, and thus the performance of an unknown coil may be readily determined.

I have found that the means and method for testing spark coils above described, because of the metering of the surge energy both in amount and time, makes the testing apparatus reliable, and substantially independent of make and general type of coil to be tested. I have also found that while there may be some constant difference in the calibration for magneto coils and for battery operated coils, that as between battery operated coils and between magneto coils, the method and circuit operates to test the coils without adjustment for make and type of coil within each class.

In Fig. 1, for example, an additional tap 32 may be provided on resistor 8 and a switch 34 used to change the charging potential of the condenser 5 for use with magneto coils, where due to use of a core, the turn ratio may be higher.

Coils which give equally good performance in practice give substantially equal results in test, whether their primary impedance be high or low, and whether or not they be provided with cores when tested. This is because the input energy to the coil is a fixed quantity, and what is measured is the ability of the coil to convert such energy into a useful spark. If the input impedance of the coil be low, the build-up and decay of current in the system is rapid, and a high potential is produced in the secondary for this reason; if the impedance be high the rate of change of current will be lower, but the inductance being greater the same secondary potential will be produced if the coils are equally effective. Shorted turns, or poor insulation, or (of course) open circuits produce the same effects irrespective of input impedance.

These facts would indicate that different results should be obtained when the same coils are tested with and without cores, owing to the iron losses introduced by the latter and by changes in coupling as between primary and secondary coils. This is, in fact, found to be the case, but the difference is found to be so small as to be unimportant in practice unless the core used is very bad indeed. For one thing, the two effects are opposite in sign, which reduces the over-all differences in test readings introduced thereby. For another, the coils which in practice are tested without cores are usually coils for magnetos, where the magnetic constants are fixed and the presumption that they are satisfactory is strong.

It is obvious that a change in the size of the condenser 5 will change the amount of energy in the test surge unless an equal and opposite change be made in the potential used to charge it. In practice this relationship is fixed once for all in the design of the tester, and since the test method gives purely qualitative and comparative results it is merely necessary that a fixed relationship be chosen and maintained in their manufacture.

The comparison therefore actually made, is between the self inductance, mutual inductance and effective resistance of the coils, as these quantities are related to and determine the performance of the coil in use.

Thus the apparatus is simple to operate, can be used by the ordinary mechanic in repair shops without complicated adjustments, and can accurately test any type of coil that may be encountered in such repair work.

I claim:

1. The method of testing a high tension spark coil such as an automotive spark plug coil and a magneto coil comprising the steps of charging a capacity to a predetermined potential, opposing the ends of the secondary of said coil across an air gap discharging said condenser through the primary of said coil as single surges, and varying the length of said air gap between surges to determine the maximum length of spark produced as the result of said surges.

2. The method of testing a high tension spark coil such as an automotive spark plug coil and a magneto coil comprising the steps of charging a capacity to a predetermined potential, opposing the ends of the secondary of said coil across an air gap of fixed length, discharging said condenser through the primary of said coil as single surges, and varying the predetermined charge potential of said condenser between surges to determine the lowest predetermined potential producing a spark across said gap.

3. Apparatus for testing spark coils or the like comprising a condenser, supply means for continuously charging said condenser in parallel with a relatively high resistance to a predetermined potential, switch means for connecting the charged condenser across the primary of said coil to discharge said condenser as a single surge, and opposed spark gap electrodes connected across the secondary of said coil and means for changing the distance between said electrodes.

4. Apparatus for testing spark coils or the like comprising a condenser, supply means for continuously charging said condenser in parallel with a relatively high resistance to a predetermined potential, switch means for connecting the charged condenser across the primary of said coil to discharge said condenser as a single surge, and opposed spark gap electrodes connected across the secondary of said coil with a fixed gap length, and means for varying said high resistance to vary the charging potential of said condenser.

5. In a device for testing spark coils having a primary and a secondary winding, electrodes providing a spark gap of predetermined length connected to said secondary winding, a condenser, a controlled electrical source for charging said condenser to a predetermined energy level, switching means connecting said condenser and the primary winding of said coil for discharging the energy stored in said condenser as a single energy unit through said primary winding to energize said secondary winding and said spark gap, and a reversing switch connected between said switching means and said primary winding.

6. The method of testing a high tension spark coil such as an automotive spark plug coil and a magneto coil comprising the steps of charging a capacity to a predetermined potential value, opposing the ends of the secondary of said coil across an air gap of predetermined length value, discharging said condenser through the primary of said coil as single surges, and varying one of said values between surges over a range including discharge and non-discharge across said air gap to determine the conversion efficiency of said coil.

7. In a device for testing spark coils having a primary and a secondary winding, electrodes positioned to provide a spark gap of a predetermined length value connected to said secondary winding, a condenser, a controlled electrical source for charging said condenser to a predetermined potential value, means for connecting the charged condenser directly across the primary of said coil to discharge said condenser as a single surge through said primary winding to energize said secondary winding and said spark gap, and means varying one of said values to determine the conversion efficiency of said coil.

8. In a device for testing spark coils having a primary and a secondary winding, electrodes positioned to provide a spark gap of a predetermined length value connected to said secondary winding, a condenser, a controlled electrical source for charging said condenser to a predetermined potential value, means for connecting the charged condenser directly across the primary of said coil to discharge said condenser as a single surge through said primary winding to energize said secondary winding and said spark gap, and means varying one of said values over a range including discharge and non-discharge conditions across said air gap.

STANLEY S. VERNEY.